United States Patent [19]

Knowles

[11] 4,311,559
[45] Jan. 19, 1982

[54] HIGH TEMPERATURE GAS COOLED NUCLEAR REACTORS

[75] Inventor: Alan N. Knowles, Delamere, England

[73] Assignee: United Kingdom Atomic Energy Authority, London, England

[21] Appl. No.: 34,277

[22] Filed: Apr. 30, 1979

[30] Foreign Application Priority Data

May 19, 1978 [GB] United Kingdom ............... 20888/78

[51] Int. Cl.³ .............................................. G21C 3/20
[52] U.S. Cl. .................... 376/432; 264/0.5; 376/418; 376/423
[58] Field of Search ............ 176/68, 75, 78, 82, 176/83, 90, 91 R; 264/0.5

[56] References Cited

U.S. PATENT DOCUMENTS

| | | | |
|---|---|---|---|
| T883,001 | 2/1971 | Pettinger | 176/83 |
| 3,194,746 | 7/1965 | Hackett | 176/83 X |
| 3,291,696 | 12/1966 | Sugimoto et al. | 176/58 X |
| 3,900,358 | 8/1975 | Ringot | 176/82 X |
| 4,056,584 | 11/1977 | Leary et al. | 252/301.1 R X |

Primary Examiner—Peter A. Nelson
Attorney, Agent, or Firm—Larson and Taylor

[57] ABSTRACT

A fuel element for a high temperature gas cooled nuclear reactor which aims at reducing the temperature difference between the fuel center and the coolant has a reduced thickness of heat transfer path and means for eliminating discontinuities therein. The fuel element has flat plates each having a inner fuel bearing sheet of coated nuclear fuel particles dispersed in a carbonaceous matrix material clad by preformed relatively thin artefacts of unfuelled carbonaceous material which have been platen pressed on to the external surfaces of the fuel sheet while both the fuel sheet and the artefacts are in the green state.

7 Claims, 4 Drawing Figures

HIGH TEMPERATURE GAS COOLED NUCLEAR REACTORS

BACKGROUND OF THE INVENTION

This invention relates to gas cooled nuclear reactors. Gas cooled nuclear reactors such as the AGR employing metal canned fuel have now been developed to yield an average outlet gas temperature of 650° C., high enough for raising steam of a quality suited for modern turbines. The High Temperature Gas-cooled Reactor (HTR) which is still under development uses graphite clad fuel elements containing fission product-retaining particles or so called coated particles and offers the prospect of yielding an outlet gas at a temperature of about 750° C. This increase in gas temperature is substantial but nevertheless the higher temperature is not essential for contemporary steam turbines and is not high enough for economical use in the more important process heat applications, such as iron smelting nor for use as working fluid in a gas turbine cycle. In both instances quoted a gas temperature of about 900° C. or above is desirable and it would seem that until a significant improvement is made the exploitation of HTR technology in these fields will be difficult.

However, the coated fuel particle which forms the basis of HTR fuel is an empirically developed item whose correct performance at high temperature is vital to sustain the heat generating process in the reactor core and the technical limits for its reliable operation have probably been reached. In fact, it is doubtful, even if a further lengthy period of development were carried out, whether the necessary increase in fuel operational temperature could be achieved. If this be so then there exists a requirement for some means of enabling the reactor outlet gas temperature of the HTR to be raised whilst keeping the particle temperature substantially unchanged thereby maintaining the integrity of the particle. Once this has been accomplished, current HTR technology will be more readily exploitable.

However, nuclear fuel designers operate under certain constraints which tend to conflict. Uniformity of performance and especially the achievement of the lowest practicable temperature drop between fuel and coolant, $\Delta T$, requires high precision in manufacture. But the cost of HTR fuel tends to be high compared with metal clad fuel and a main source of this lies in the complex machining and inspection required to achieve precision with the fuel element configurations proposed hitherto. A desirable manufacturing route would be one which yields a precisely dimensional product using simple automated processes both for fabrication and inspection. Such a route would assist in reducing both $\Delta T$ and the fabrication cost.

Several methods of manufacturing HTR fuel have been proposed hitherto based on cylindrical fuel compact designs. These designs and their methods of manufacture result in a fuel compact which presents a relatively large temperature difference ($\Delta T$) between fuel particles and the cooled surface of the cladding. This is due in the case of the "tubular interacting" type of fuel element to a relatively thick graphite layer between fuel and coolant and to the unavoidable clearance gaps between the fuel compact and its enclosing graphite cladding. In the "integral block design" of fuel bearing member the thermal resistance of the graphite block itself acts as an appreciable barrier to heat transfer between fuel compacts contained in holes in the block and those holes through which the coolant passes. One prior proposal which eliminates the contribution to the $\Delta T$ made by the clearance gap between a cylindrical fuel compact and its cladding, resides in adopting an isostatic pressing together of these components in the green state. However, this technique results in a high degree of non uniformity both on the exterior of the pressed product and on the internal boundaries between fuelled and fuel free layers. The former is remedied by surface machining which is intrinsically costly while the latter leads to high mean thicknesses for the fuel free layers giving high $\Delta T$.

The characteristics of various HTR fuel designs have been discussed in the Proceedings of NUCLEX, an exhibition held at Basle, Switzerland, 16–21 Oct. 1972; see in particular Paper 3/13, "HTR Fuels and their future development" by L W Graham and M S T Price.

SUMMARY OF THE INVENTION

According to the invention in one aspect a nuclear fuel containing body for a high temperature gas cooled nuclear fuel element comprises a flat plate in which the nuclear fuel is contained as a dispersion of fission product retaining coated fuel particles in a flat sheet of carbonaceous matrix material, the sheet being clad with a thin layer of unfuelled graphite bonded to the sheet by being formed from a plurality of separate preformed graphite artefacts which are platen pressed on to the exterior surfaces of the flat sheet whilst both the matrix material and the artefacts are in a green state, to enclose the sheet.

Otherwise expressed the invention resides in forming nuclear fuel bearing bodies for use in a high temperature gas cooled nuclear reactor coolant channel by firstly forming a dispersion of coated nuclear fuel particles in a flat sheet of carbonaceous matrix material and cladding the flat sheet with a layer of graphite material by firstly making separate performed carbonaceous artefacts and then platen pressing the preformed artefacts on to the flat sheet whilst both the artefacts and the matrix material are in the green state. By producing fuel plates in this manner it is envisaged that a cladding of about 1 mm thickness is applied to the fuel sheet and bonded thereto. The temperature drop between fuel centre temperature and coolant may thereby be reduced to below the 600° C. which presently typically obtains with tubular interacting designs and multi-hole columnar block designs. Furthermore, platen pressing eliminates the need for complex machining and lends itself to automated manufacture and inspection and thus represents an advance over tubular interacting pin designs and over the complex multi-hole columnar block design.

A high temperature gas cooled nuclear fuel element incorporating nuclear fuel plates as aforesaid may comprise a tubular member of neutron moderating material with support structure within its bore for supporting a plurality of said plates in parallel planes and spaced apart to allow coolant to pass between the plates.

The support structure mentioned above preferably comprises a spider-like partition member having a central spine coaxial with the tubular member and partition walls partitioning the bore of the tubular member into a member of similar subchannels. Each subchannel may then contain an array of parallel, spaced apart, flat fuel plates with their flat faces exposed to coolant gas which passes through the subchannels. These sidefaces are clad with their wafers of moderator material which being applied by the pressing of a thin preformed artefact onto the inner fuel containing sheet present only a very short path for the transfer of heat from the fuel to the coolant. Typically the thin wafers may be only 1 mm thick after pressing.

DESCRIPTION OF THE DRAWINGS

In order that the invention may be better understood one form of fuel element which embodies the invention will now be described with reference to the accompanying drawings in which.

DESCRIPTION OF THE PREFERRED EMBODIMENT

Figure 1:
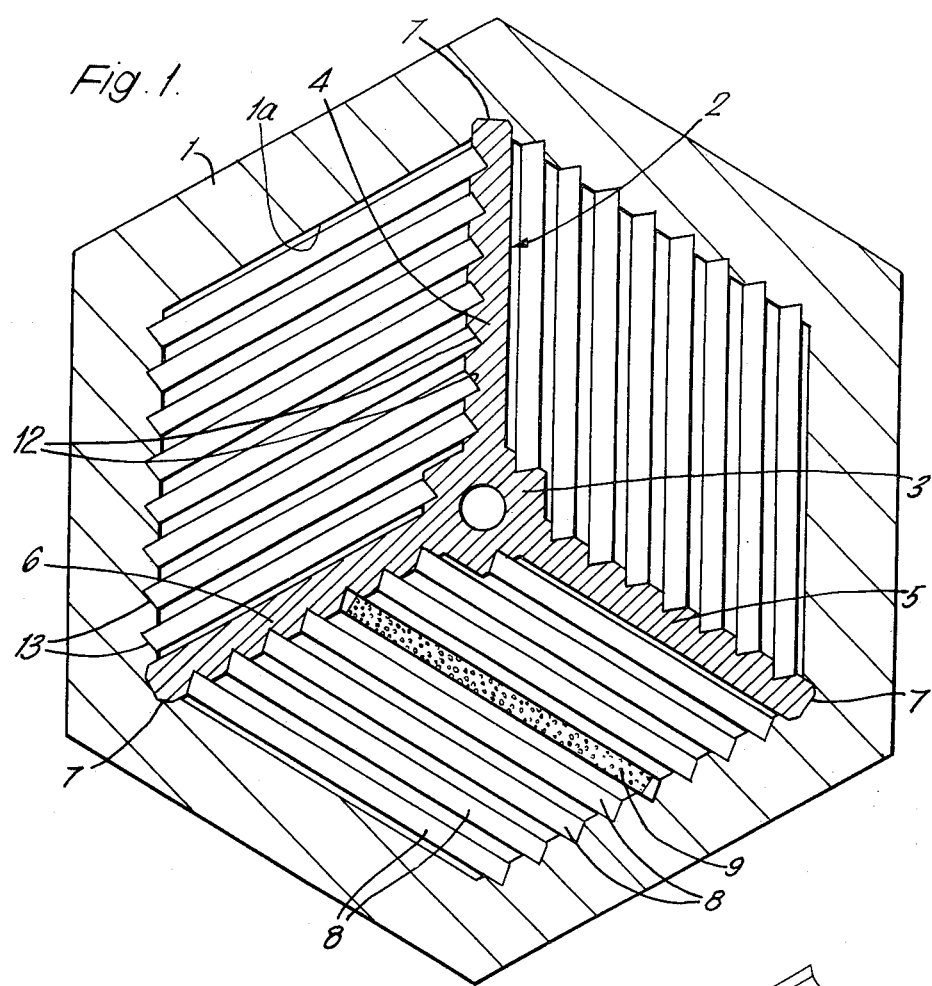
FIG. 1 is a view of the fuel element in cross section normal to its longitudinal axis.
Figure 2:
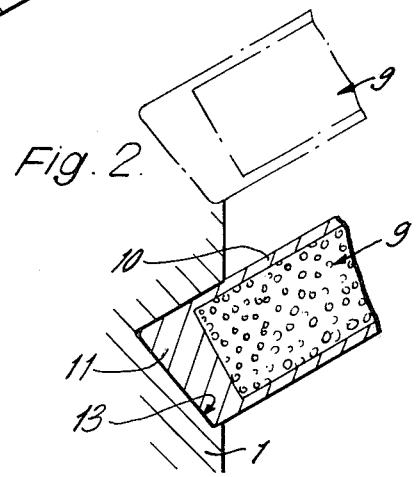
FIG. 2 is a view of a part of FIG. 1 to an enlarged scale and shows part of a fuel plate in cross section.
Figure 3:
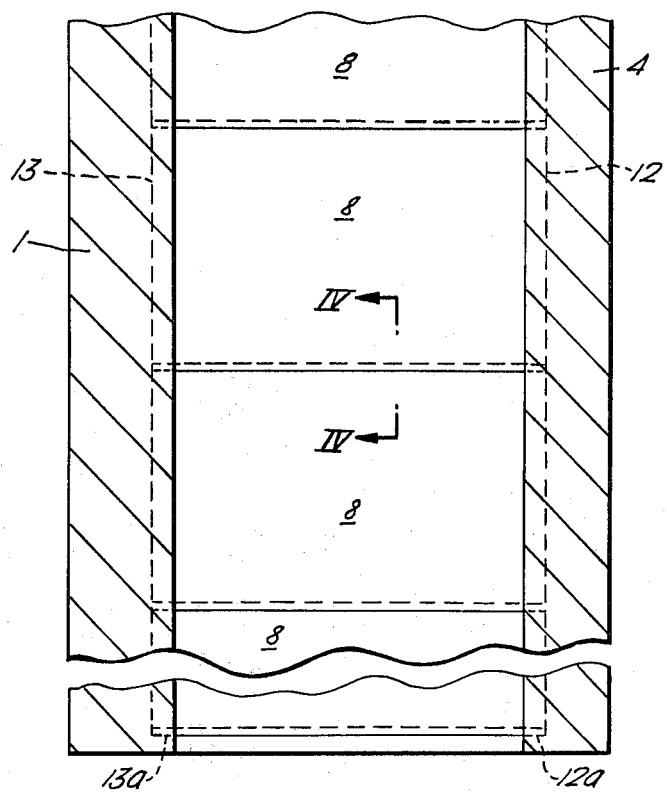
FIG. 3 is a view of the fuel element on the line III—III of FIG. 1.
Figure 4:
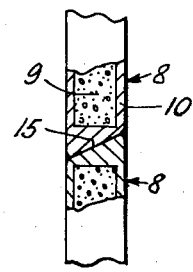
FIG. 4 is a view on the line IV—IV of FIG. 3.

In the drawings the fuel element shown comprises a hexagonal graphite tube 1 whose bore 1a is divided into three similar axial passageways or subchannels by a spider-like partition member 2. The member 2 has a central stem 3 with three partition walls 4, 5, 6 extending therefrom at 120° spacing. The extremities of the walls 4–6 are fixed into longitudinal grooves 7 at three corners between flats on the hexagonal bore wall. The walls 4–6 extend the full length of the tube and one face of each wall contains parallel grooves 12 for locating one edge of each of an array of fuel plates 8. An abutment 12a (FIG. 3) is formed at the bottom of each groove 12. Opposite to the groove 12 a set of similar grooves 13 in the bore wall receive the other edge of the fuel plates. An abutment 13a is provided at the base of each groove 13 to support the lowest fuel plate. The nuclear fuel is contained as coated particles in inner sheet 9 of graphitic matrix material as a dispersion of particles. Each sheet 9 has its side faces clad with a thin wafer 10 of unfuelled graphite whilst the edges of the sheet are clad more thickly with a layer 11 of the same material. A number of such plates are supported in each subchannel in parallel planes, edge-on to the axial coolant flow with the edges of the plates engaging opposite grooves 12, 13. Plates in adjacent subchannels are inclined to one another. The abutting edges of the plates which are superimposed, are chamfered as shown at 15, FIG. 4, because it has been found that in this way vibration of the plates in the grooves may be reduced or avoided. The depth of the plates (a dimension measured axially of the tube bore) is determined by the particular fuel plate production process employed in making the plates but it is considered desirable that two or more tiers of plates are needed to occupy the full length of the tube.

It is preferred to form the plates in the following way. Each plates 8 is a pressing made up of preformed lightly bonded artefacts of three different kinds namely, a sheet 9 of fuel dispersed in a matrix, thin wafers 10 to form side cladding of the sheet and bars to form the edge cladding layer 11. The three kinds of artefacts are as follows.

i. a relatively thick (about 8 mm after pressing) rectangular sheet 9 of lightly bonded graphitic matrix material mixed with a bonding agent containing a dispersion of fission product retaining ceramic fuel particles giving a fuel density of 0.6 grams heavy metal/cm$^3$ after pressing;

ii. a wafer 10 of unfuelled lightly bonded graphite powder mixed with a bonding agent of the same rectangular dimensions as the fuel sheet but of a thickness which would reduce to about 1 mm after pressing;

iii. bars of unfuelled lightly bonded graphite powder mixed with a bonding agent whose final size (after pressing) will be about 10 mm×8 mm and whose length is defined to match the lengths of the sides of the fuel sheet.

Each plate is made from an assembly of two wafers 10 one applied to each side face of the fuel sheet 9 and four bars applied one to each edge of the sheet. Thus assembled the artefacts are platen pressed to close fine dimensional tolerances so consolidating the parts into a unitary fuel plate. The need for further finishing operations is avoided. The fuel plate is then heated to carbonise the bonding agent.

If desired the pressing die may impart to heat transfer surfaces of the plate a special finish to give an extremely low temperature drop in the coolant film.

It is estimated that with the fuel element described a gas temperature some 140° C. higher than that obtainable with integral block elements may be achieved without increase in fuel centre temperature and without significant increase in fabrication cost and pumping power.

By lightly bonded graphite powder is meant graphite powder which has been mixed with or precoated with stearic acid or another bonding agent such as a 12% hy wt solid phenolformeldehyde resin reducable to carbon on heating but which when uncured or partially cured is said to be in the green state. The resin selected is preferably that disclosed in our UK Pat. No. 1,327,786 and referred to in the composition of a matrix forming material.

I claim

1. A high temperature gas cooled nuclear reactor fuel element including a plurality of nuclear fuel-containing bodies and means for mounting said bodies for exposure to the nuclear reactor coolant, said bodies each comprising a flat sheet of carbonaceous matrix material, a multiplicity of fission product retaining coated fuel particles dispersed in said matrix material, and a thin layer of unfuelled graphite bonded to the exterior of the surfaces of the flat sheet so as to enclose the sheet, said thin layer being formed from a plurality of separate carbonaceous artefacts platen pressed on to said exterior surfaces whilst both it and the matrix material are in the green state.

2. A fuel element according to claim 1, wherein said means for mounting comprises a tubular member of neutron moderating material, and means within the bore of the tubular member for supporting said bodies by their opposite edges in parallel, spaced-apart planes.

3. A fuel element according to claim 2, comprising means for supporting said bodies in tiers within the bore of said tubular member with abutting edges of said bodies chamfered so that marginal portions of adjacent plates overlap one another.

4. A fuel element according to claim 1, including partition means disposed within the bore of said tubular member for dividing the bore into subchannels and for supporting the said bodies with the aid of the wall of said tubular member.

5. A fuel element according to claim 4, wherein said partition means and the wall of said tubular member are formed with opposed parallel grooves extending axially, for location of opposed edges of the said bodies.

6. A fuel element according to claim 1, wherein the said thin layer of unfuelled graphite is about 1 mm thick.

7. A method of forming fuelled bodies for a high temperature gas cooled nuclear reactor fuel element which comprises the steps of forming a dispersion of fission product retaining coated fuel particles in a flat sheet of carbonaceous matrix material, and cladding the flat sheet of matrix material with a layer of unfuelled carbonaceous or graphitic material by firstly making separate performed artefacts and then platen pressing the performed artefacts on to the surface of the flat sheet whilst both the artefacts and the matrix material are in the green state.

* * * * *